April 9, 1935. W. R. GRISWOLD 1,997,056
TRANSMISSION MECHANISM
Filed Jan. 25, 1932
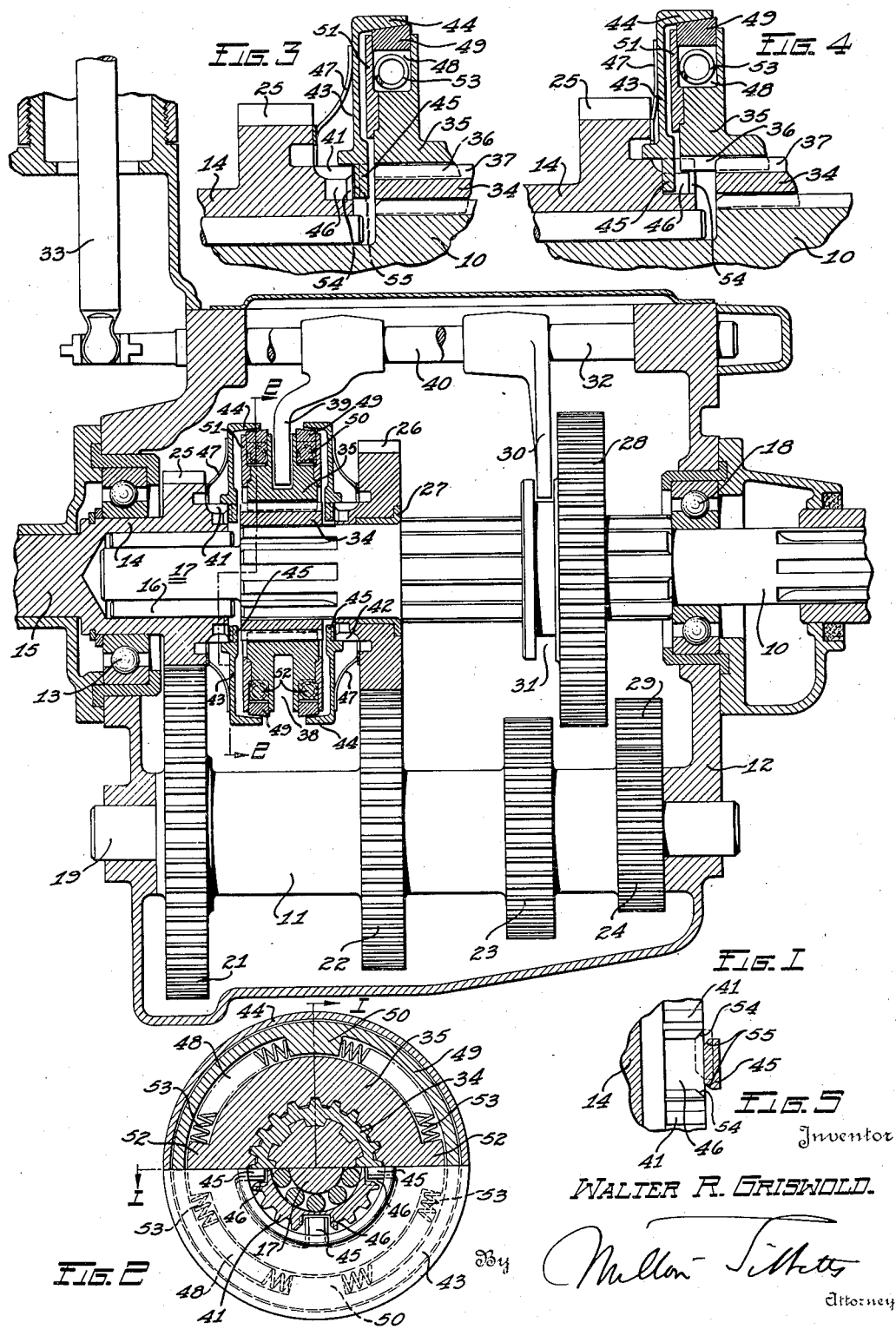
Inventor
WALTER R. GRISWOLD.
By Milton Tibbetts
Attorney Patented Apr. 9, 1935

1,997,056

UNITED STATES PATENT OFFICE 1,997,056

TRANSMISSION MECHANISM

Walter R. Griswold, Detroit, Mich., assignor to Packard Motor Car Company, Detroit, Mich., a corporation of Michigan Application January 25, 1932, Serial No. 588,568

7 Claims. (Cl. 192—53)

This invention relates to motor vehicles and more particularly to the transmission mechanism of such vehicles.

In the operation of motor vehicles, it is requisite to smooth gear changing that the gears which are to be meshed be brought to the same or substantially the same peripheral speed before engagement of the gear teeth. Thus after disconnection of the vehicle clutch and the previously meshed gears of a conventional transmission, the operator must either wait for a more rapidly moving gear element to lose speed, or in some instances must accelerate a more slowly moving gear by reconnecting it to the engine through the clutch. These maneuvers require a considerable measure of skill on the part of the operator and also prevent the free and rapid changing from one gear train to another as the contingencies of vehicle operation may dictate, so that gear changing has come to be considered as perhaps the most difficult task incident to the operation of a motor vehicle.

To assist the operator in making rapid and quiet shifts, it has been previously proposed to synchronize the gears to be meshed by various means, such as friction clutches. Such devices, however, have been open to certain objections. The mechanisms employed have been, in general, cumbersome and complicated. Frequently the friction elements have not been applied with sufficient pressure to effect proper synchronization within the very short time interval available for this purpose, or if so applied, the operating mechanism has been subjected to excessive wear. This has made it necessary to release the synchronizing means immediately upon engagement of the gears, which in turn requires delicate and complicated means to determine the exact time of application and of release.

One of the objects of this invention is to provide a motor vehicle transmission having an improved device for synchronizing the rotatable elements, which is simple and effective, and in which it is unnecessary to release the device after meshing of the rotatable elements is effected.

Another object of this invention is to provide a motor vehicle transmission with a device of the character designated in which the operation of the synchronizing clutches is effected through synchronizing means of a character such that accurate timing of the application and release is unnecessary.

A further object of the invention is to provide a transmission synchronizing device in which the engagement pressure of friction elements is considerably augmented to bring the rotatable elements quickly to synchronous speed, and in which the friction elements will remain in engagement while the rotatable elements are in mesh.

Other objects of the invention will appear from the following description taken in connection with the drawing, which forms a part of this specification, and in which:

Fig. 1 is a view, partially in side elevation and partially in vertical section through a motor vehicle transmission constructed in accordance with the invention;

Fig. 2 is a view in section taken substantially on line 2—2 of Fig. 1;

Figs. 3 and 4 are enlarged fragmentary sectional views of part of the transmission shown in Fig. 1, illustrating successive positions of the device during a characteristic gear changing operation;

Fig. 5 is a fragmentary sectional view illustrating one of the grooves in the gear extension and an associated tongue of a friction drum.

Referring to the drawing, in Fig. 1 is shown a motor vehicle transmission comprising a splined transmission shaft 10 and a countershaft or gear spool 11, mounted in a housing or transmission case 12. The front wall of the housing carries a suitable bearing 13 in which is mounted the enlarged rear end 14 of a driving shaft 15, which may be the vehicle clutch shaft, driven from the vehicle engine through conventional clutch mechanism (not shown). The enlarged end 14 of the clutch shaft is formed with an axial recess for the reception of a bearing 16, in which the reduced forward end 17 of the transmission shaft 10 is journaled. The rear end of the shaft 10 is journaled in a bearing 18, supported in the rear wall of the housing 12, and is connected in the usual way to the propeller shaft to drive the vehicle, this connection not being shown.

The countershaft 11 is in the form of a hollow spool, mounted to rotate on an arbor 19, supported at its ends by the transmission case walls, and this spool is formed with a number of integral gears 21, 22, 23 and 24. Of these, the gear 21 is in constant mesh with a gear or pinion 25, formed on the enlarged end 14 of the shaft 15, so that the countershaft 11 is continuously connected to and driven from the clutch shaft 15 in the well known manner. The gear 22 is also continuously in mesh with a gear 26 which is mounted for rotation on a bearing sleeve 27, pressed or otherwise rigidly mounted on the shaft 10, as will be readily understood.

Gears 23 and 24 constitute the low speed and reverse gears respectively, and are adapted to drive the gear 28 which is splined to and slidable on the shaft 10, this gear 28 being directly engageable with the gear 23. It may be driven from the gear 24 through a reverse idler pinion 29 in the well known manner. Such sliding action is effected in the usual way by means of a shifter fork 30, which engages in a groove 31 in the body of the gear 28, this fork being actuated by a shifter rod 32 slidably mounted in suitable bearings in the upper part of the cover portion of the casing 12. The shifter rod 32 is selectively actuated by a lever 33, of usual form, which may be manually operated by the vehicle driver in the well known manner. Thus in the illustrated embodiment of the invention, gear 28 may be moved to mesh with gear 23, to provide a first speed, or connected through pinion 29 to gear 24 to provide a reverse. Second speed is provided by connecting the constant mesh gear 26 to the shaft 10, and third or high speed is secured by coupling the shafts 10 and 15, thus providing a direct drive.

To provide the second and high speed connections described, the forward portion of the shaft 10 is provided with a clutch device which is slidably splined to the shaft between the gears 25 and 26. This device includes a hub 34, which is in the form of a ring having internal and external splines, and an axially shiftable clutch ring 35. The hub is splined to the end of the shaft 10 while the clutch ring is formed with splines 36 which engage with the external splines 37 on the hub so that the clutch ring, hub and shaft 10 will rotate in unison while the clutch ring can be shifted axially relative to the hub. The clutch ring is provided with a circular groove 38 into which extends a shifter fork 39 which is fixed on a shifter rod 40 arranged to be operated by the lever 33 in the usual manner. The large end of the shaft 15 terminates in an extension of reduced diameter on which is formed teeth 41 and on one end of the gear 26 is an extension on which is formed teeth 42.

The internal splines of the clutch ring are arranged to engage with either the teeth 41 or the teeth 42 associated with the gears 25 and 26 respectively depending upon the direction of the shift. It will be evident that when the clutch ring is in engagement with the teeth 42, the constant mesh gear 26 is locked to the shaft 10, thus providing the second speed, and that when the teeth 41 are engaged with the clutch ring, the shafts 10 and 15 are directly coupled, thus providing the third speed which is a direct drive.

To perform the clutch operation just described without shock or clash, this invention provides synchronizing devices adapted to bring the pairs of clutch teeth 36—41 or 36—42 to the same speed before positive engagement through means of the clutch member 35. For this purpose, drums 43 are slidably mounted on the teeth 41 and 42 and are provided with rim portions 44 which telescope the end portions of the clutch ring, the inner surfaces of the rims providing conical friction surfaces. Such drums are formed with a plurality of inwardly extending tongues 45 which are adapted to engage with grooves 46 formed in the extensions of the gears 25 and 26, such tongues, however, being normally held out of engagement with the grooves 46 by means of spring members 47 interposed between the drums and the adjacent gear 25 or 26.

Each peripheral end of the positive clutch member 35 is provided with a circularly extending recess 48 and arranged therein is a ring 49 having a pair of inwardly extending oppositely arranged abutments 50. The rings are provided with a peripheral conical friction surface adapted to be engaged with the conical friction surfaces of the telescoping drum rims, and the friction rings are secured in the recesses by means of plates 51 which are secured to the ends of the clutch ring 35. The positive clutch member is provided with oppositely disposed abutments 52 extending into the recesses 48. The abutments 50 and 52 are alternately arranged and between each pair of adjacent abutments is a coil spring 53.

The end portions of the grooves 46 are formed with beveled or chamfered faces 54 while the ends of the tongues 45 which first engage with the grooves 46 are beveled or chamfered as indicated at 55 complementary to the associated beveled ends of the grooves 46.

When the clutch device is in the position shown in Fig. 1, no power is transmitted from the shaft 15 to the shaft 10. When a direct drive is desired between the shaft 15 and the shaft 10, the clutch device is moved toward the left by means of the shifter fork 39 and such movement first frictionally engages the conical periphery of the ring 49 with the conical rim surface of the friction drum 43 at the left, as shown in Fig. 3, so that the friction drum is moved axially toward the left. Such axial movement can only be accomplished in case the tongues 45 are aligned with the grooves 46 and because of the relative drag resulting from the rotation between these members, the tongues 45 will take up a position to one side or the other of the slots 46 with a beveled surface 55 in contact with a beveled surface 54. To move the tongues into the grooves, therefore, it is necessary to turn the member 43 by means of the cam action between the beveled faces 54 and 55 in a direction opposed to the torque caused by the relative rotation between the tongues 45 and the clutch member 35. This cannot be accomplished until the torque is nearly zero, which condition is only obtained when the relative speed between the members is nearly zero; that is, when they are approximately synchronized. This will occur within a very short space, because the conical friction clutch faces are arranged at a very small angle so that the clutch member takes hold with great force. Continued shifting movement of the member 35 toward the left will then result in moving the drum 43 to the left, the tongues 45 entering their respective grooves 46, and as the members are now synchronized there is no difficulty in connecting the teeth 36 with the teeth 41 by means of a continued axial movement of the clutch member 35 toward the left. Through means of the springs 53 there is a resilient driving connection between the friction rings 49 and the clutch member 35, thus allowing sufficient relative rotation for the teeth 36 to align with the teeth 41 after synchronization has taken place, that is, in case such teeth are not in clutching alignment at the end of the synchronizing effort. In this manner the synchronization of the clutch member 35 with the gear 25 and a positive clutching connection can be made, as shown in Fig. 4 by shifting the fork 39 to the left and without hesitation.

Movement of the fork to the right will disengage the teeth of the member 35 from the teeth 41 and the spring means 47 will return the friction drum 43 to its normal position, as shown in Fig. 1. It is obvious that by shifting the fork 39 to the right, synchronizing and clutching of the member 35 with the gear 26 will occur in the same manner as described with respect to gear 25 so that a reduced drive can be made between the shaft 15 and the shaft 10 through the train of gears leading to the gear 26.

Although the invention has been described in connection with a specific embodiment, the principles involved are susceptible of numerous other applications which will readily occur to persons skilled in the art. The invention is therefore to be limited only as indicated by the scope of the appended claims.

What I claim is:

1. In a transmission mechanism, a driving member, a driven member, a positive clutch member shiftably mounted on one of the members and engageable with the other member, and synchronizing mechanism comprising a friction clutch element shiftable into positive engagement with the member which the positive clutch member is shifted to engage, friction means on the positive clutch member engageable with the friction clutch element, a flexible driving connection between the shiftable positive clutch member and the friction means thereon, and resilient means urging said friction clutch element out of positive engagement with the member engageable by the positive clutch member.

2. In a transmission mechanism, a driving member, a driven member, a positive clutch member shiftably mounted on one of the members and engageable with the other member, and synchronizing mechanism comprising a friction clutch element shiftable axially into positive engagement with the member which the positive clutch member is shifted to engage, friction means on the positive clutch member engageable with the friction clutch element, a resilient driving connection between the shiftable positive clutch member and the friction means thereon, and spring means urging said friction clutch element axially away from positive engagement with the member engageable by the positive clutch member.

3. In a transmission mechanism, a driving member, a driven member, a positive clutch member mounted on the driven member and axially shiftable to engage the driving member, a friction clutch element positively engageable with the driving member, means normally holding said friction clutch element out of positive engagement with the driving member, a friction clutch element carried by the positive clutch member and engageable with the other friction clutch element, and a resilient driving connection between the positive clutch member and the friction clutch element carried thereby.

4. In a transmission mechanism, a driven member, a driving member having an extension having peripheral recesses therein, a friction clutch element having a hub portion mounted on the extension and tongues engageable in the recesses, means between said clutch element and said driving shaft urging said tongues out of engagement with the recesses, a positive clutch element on the driven member and shiftable axially to positively engage the driving member, a friction clutch element on the positive clutch element engageable with the other friction clutch element prior to engagement of the positive clutch element with the driving member, and a resilient driving connection between the positive clutch element and the friction clutch element mounted thereon.

5. In a transmission mechanism, a driving member, a driven member, a friction clutch element shiftable axially into positive engagement with the driving member, a positive clutch element carried by the driven member and engageable with the driving member, an endless friction ring carried by the positive clutch element, and a resilient driving connection between the positive clutch element and the ring, said ring being adapted for frictionally engaging the friction clutch element and moving it into positive engagement with the driving member when the positive clutch element is moved toward engagement with the driving member.

6. In a transmission mechanism, a driving member, a driven member, a friction clutch element shiftable axially into positive engagement with the driving member, a positive clutch element carried by the driven member and engageable with the driving member, a friction ring carried by the positive clutch element and engageable with the friction clutch element upon axial shifting of the positive clutch element, abutments extending alternately from adjacent portions of the positive clutch element and the ring, and spring means between adjacent abutments.

7. In a transmission mechanism, a driven member, a driving member having an extension, the end of said extension having peripheral teeth and a plurality of recesses chamfered at the ends and deeper than the teeth, a friction clutch element having a hub portion mounted on the teeth and tongues engageable in the extension recesses, means exerting axial pressure against the friction clutch element tending to disengage the tongues from the recesses, a positive clutch element mounted on the driven member, said positive clutch element being axially shiftable to engage the teeth on the driving member, a friction clutch element carried by the positive clutch element, and resilient driving connections between the positive clutch element and the friction clutch element carried thereby, axial shifting of the positive clutch element engaging the friction clutch elements and engaging the tongues in the extension recesses in advance of the engagement of the positive clutch element with the driving member.

WALTER R. GRISWOLD.